(No Model.)  5 Sheets—Sheet 1.

P. GENDRON.
MACHINE FOR TRUING TIRES.

No. 430,844. Patented June 24, 1890.

Witnesses:
Geo. A. Gregg.
P. M. Hulbert

Inventor
Peter Gendron
By James Whittemore
Att'y.

(No Model.) 5 Sheets—Sheet 3.

P. GENDRON.
MACHINE FOR TRUING TIRES.

No. 430,844. Patented June 24, 1890.

Witnesses:
Geo. A. Gregg
N. M. Hulbert

Inventor
Peter Gendron
By James Whittemore
Att'y.

(No Model.) 5 Sheets—Sheet 4.

P. GENDRON.
MACHINE FOR TRUING TIRES.

No. 430,844. Patented June 24, 1890.

Witnesses
Geo. A. Gregg.
P. M. Hulbert

Inventor.
Peter Gendron
By James Whittemore
Att'y

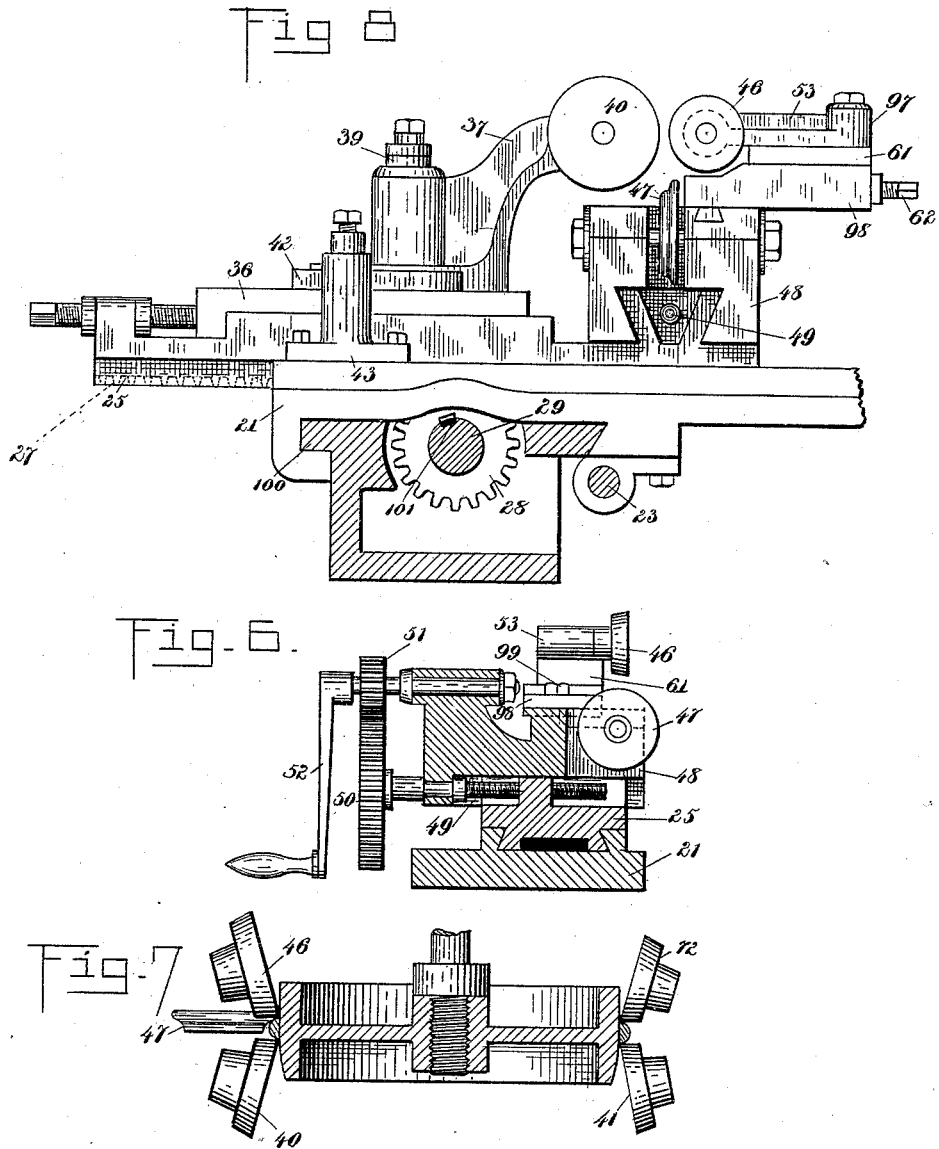

UNITED STATES PATENT OFFICE.

PETER GENDRON, OF TOLEDO, OHIO, ASSIGNOR TO THE GENDRON IRON WHEEL COMPANY, OF SAME PLACE.

MACHINE FOR TRUING TIRES.

SPECIFICATION forming part of Letters Patent No. 430,844, dated June 24, 1890.

Application filed January 8, 1890. Serial No. 336,305. (No model.)

*To all whom it may concern:*

Be it known that I, PETER GENDRON, a citizen of the United States, residing at Toledo, in the county of Lucas and State of Ohio, have invented certain new and useful Improvements in Machines for Truing Tires, of which the following is a specification, reference being had therein to the accompanying drawings.

This invention relates to new and useful improvements in machines for truing tires; and the invention consists in the peculiar construction of a truing-head adapted to be rotated, having a tapering portion and a cylindrical portion upon which the tire is fed by proper mechanism, and of rolls operating upon the side and front and rear edges of the tire for rolling the same upon the truing-head, whereby both edges are made parallel and the tire itself is expanded to a true circle with all the irregularities which may be present after the welding rolled out; further, in the peculiar arrangement of the side and rear truing-rolls, whereby the tire is easily removed from the truing-head; and it further consists in the peculiar construction of the feed mechanism for feeding the tire upon the truing-head; and, further, in the peculiar construction, arrangement, and combination of the various parts, all as more fully hereinafter described.

Figure 1:
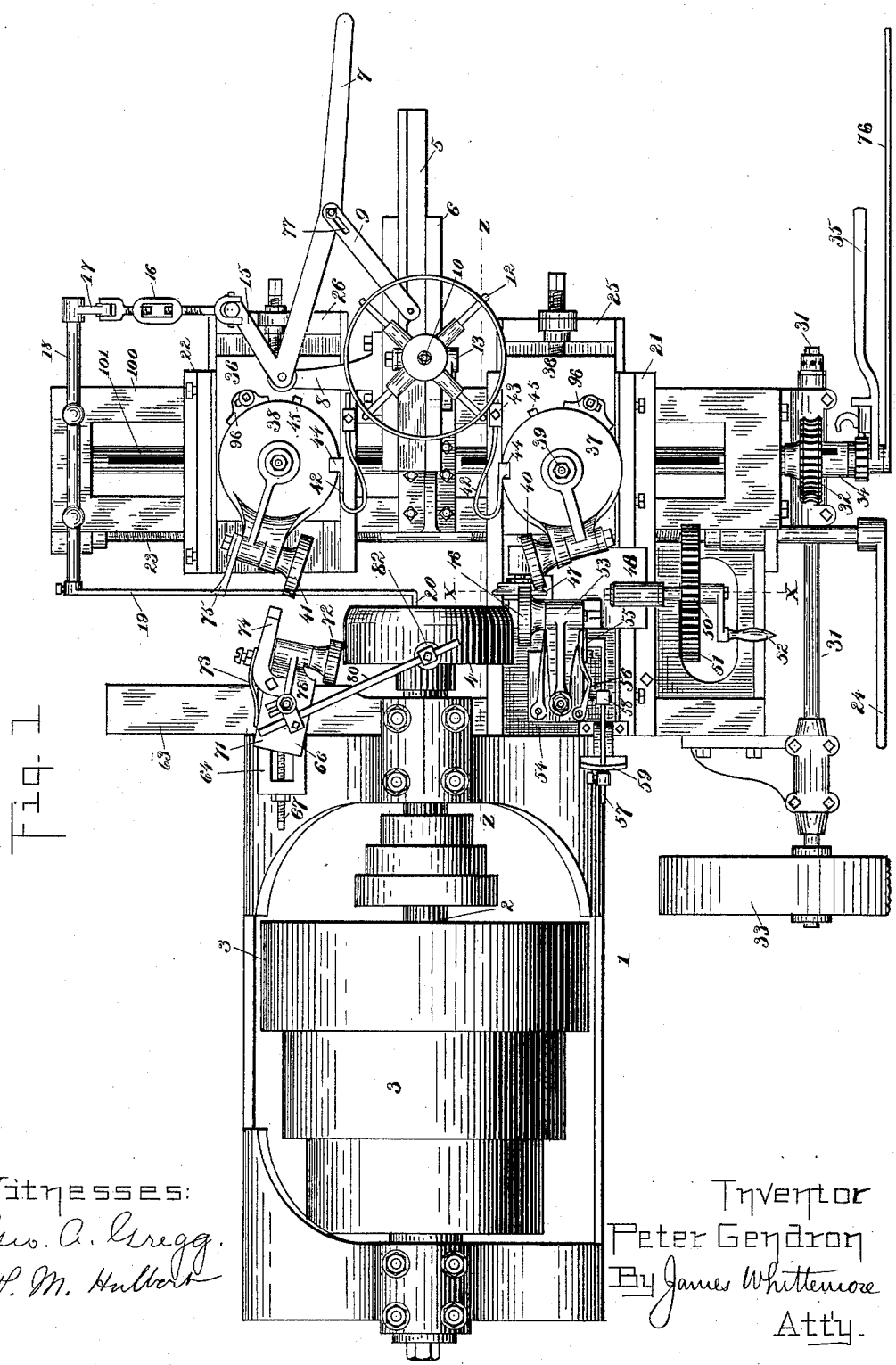
Figure 2:
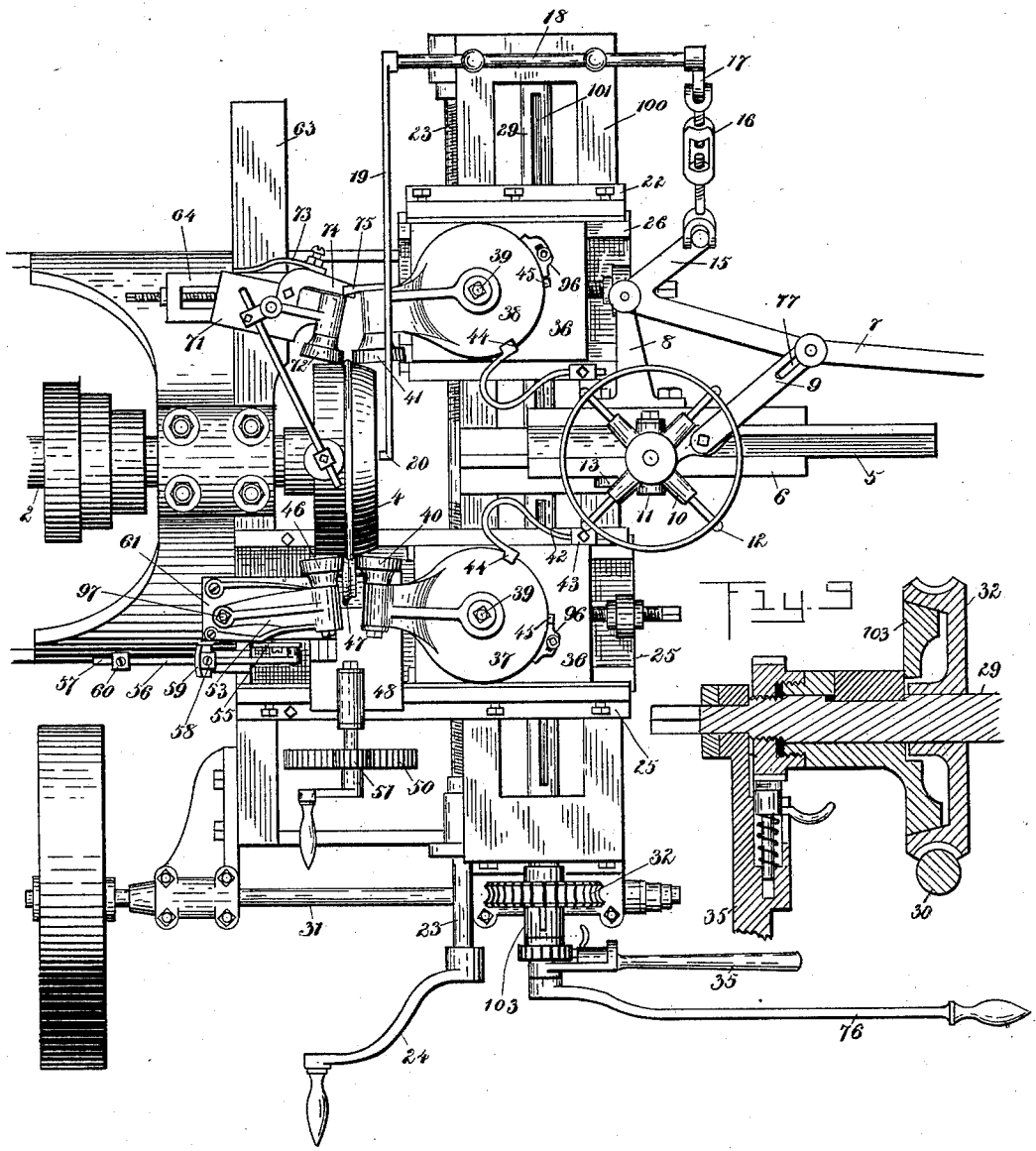
Figure 3:
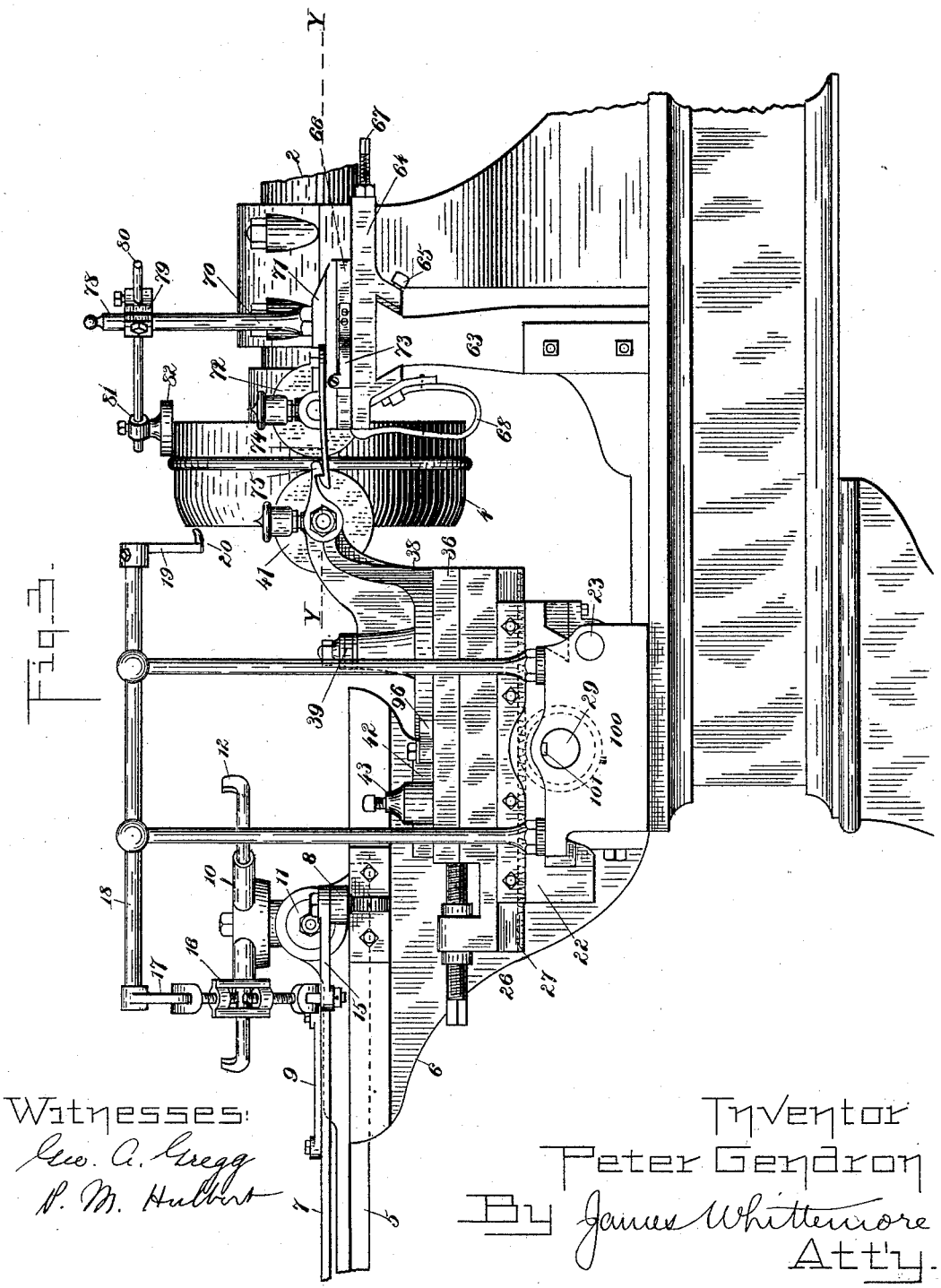
Figure 4:
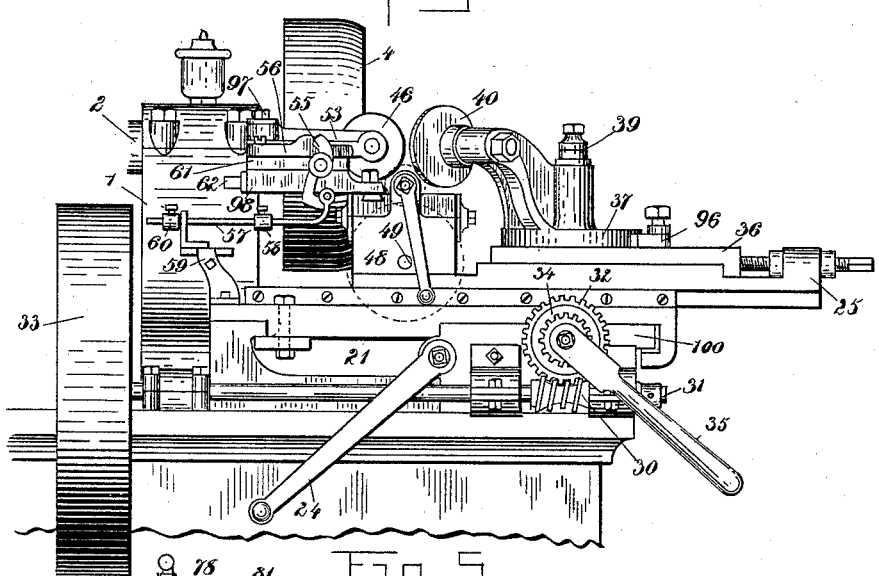
Figure 5:
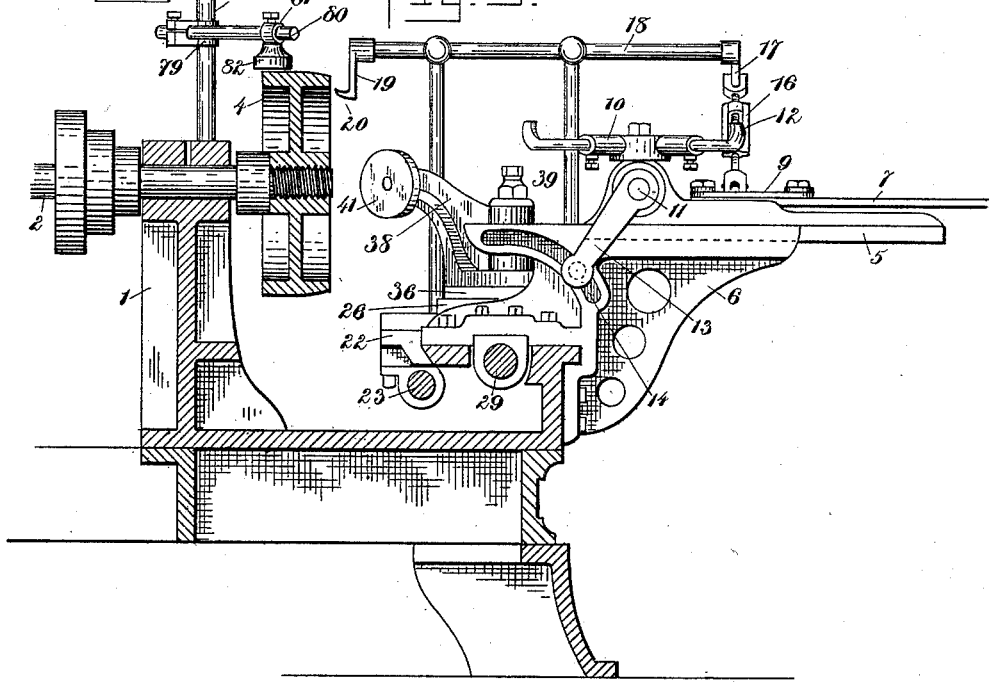

In the drawings which accompany this specification, Figure 1 is a plan view of my improved machine, showing the parts ready to begin operations. Fig. 2 is a plan view showing the parts in operation. Fig. 3 is a side elevation of the operating parts, looking from the right-hand side. Fig. 4 is an elevation of the operating parts, looking from the left-hand side. Fig. 5 is a vertical central section through the truing-roll, partly in elevation. Fig. 6 is a cross-section on line $x$ $x$ in Fig. 1. Fig. 7 is a cross-section on line $y$ $y$ in Fig. 3, partly in elevation. Fig. 8 is a cross-section on line $z$ $z$ in Fig. 1. Fig. 9 is a sectional detail of the friction-clutch.

1 is the main frame for supporting the parts. 2 is the main drive-shaft journaled therein in suitable bearings, and having suitable drive-pulleys 3 connected to any source of power by means of belting. To the front end of this shaft is detachably secured a truing-head 4. This head is tapering at its forward end and of cylindrical shape in rear of the tapered portion, the forward end of the truing-head being of smaller diameter than the diameter of the tire to be trued and the cylindrical portion being of larger diameter than the diameter of the tire.

5, Figs. 1 and 3, is a feed-table slidingly secured in the upwardly-extending arm 6 of the main frame, and is moved to and from truing-head by means of the feed-lever 7, pivoted to the bracket 8 on the frame and connected to the feed-table 5 by the connecting-link 9.

10 is a tilting tire-holder pivoted to the top of the sliding feed-table by means of the transverse shaft 11. This tire-holder has suitable adjustable arms 12, having the upturned ends adapted to receive and hold the tire, and is also provided with a downwardly-projecting crank-arm 13, Fig. 5, having a pin engaging into a segmental circular slot 14, all so arranged that the forward movement of the feed-lever moves the feed-table and tilts the tire-holder from the horizontal to the vertical position while advancing it to the truing-head to engage the tire thereon, the reverse motion bringing it back to the position shown in Fig. 1.

15, Fig. 2, is an arm of the lever 7, connecting by an adjustable connecting-link 16 to the crank 17 of the rock-shaft 18, journaled in a suitable frame and provided at its other end with a delivery-arm 19, extending in front of the truing-head, and having a hooked end 20 just below the top of the head, all so arranged that the movement of the feed-lever 7 will raise and lower the arm 19 in front of the truing-head.

21 and 22 are transverse adjustable bed-plates slidingly secured upon the transverse guides 100 of the main frame and adjustable to and from each other by means of the shaft 23, having right and left hand screw-threads engaging into screw-threaded nuts on the under side of the bed-plates.

24 is a handle arranged in convenient proximity to the operator for turning the shaft to adjust these bed-plates.

25 and 26 are longitudinally-sliding carriages carried by the bed-plates 21 and 22, respectively. These carriages are operated by a feed device, which consists of the rack-bars 27, arranged on the under side thereof, with which the gear-pinions 28 engage. These gear-pinions are slidingly secured upon the shaft 29, which is provided with the key-way 101, in which a feather on the gear engages. Motion is imparted to the shaft 29 from the worm-screw 30 on the feed-shaft 31 which meshes with the worm gear-wheel 32, a suitable pulley 33 being secured upon the shaft to receive the belt from any suitable source of power. The worm gear-wheel 32 is loosely sleeved upon the shaft 29, and is thrown into and out of engagement with the shaft by means of a suitable friction-clutch 103, slidingly secured upon the shaft operated by means of the hand-lever 35. Upon the sliding carriages are secured the adjustable base-plates 36, on which are mounted the swinging roller-heads 37 and 38, journaled upon the vertical pivots 39. Upon these heads are journaled the front truing-rolls 40 and 41 upon suitable transverse shafts. Each of the swinging roller-heads is engaged by a spring-dog 42, one end of which is secured to the stationary bed-plates 25 and 26 by means of the standard 43. The other end has an enlarged head 44 engaging into a corresponding notch in the periphery of the roller-heads, and which, when the carriage is moved forward toward the work, rotates the head against the tension of the spring-dogs to bring the rolls into their proper position for working, as shown in Fig. 2, the reverse movement rotating them to the position shown in Fig. 1.

45 are abutments on the roller-heads, which strike the stops 96 to limit the rotary motion of the roller-heads, the stops being provided with suitable abutments.

The sliding carriage 25 has a rearward extension, upon which is mounted the transverse sliding carriage 48, which carries the rear roll 46 and the side roll 47. The carriage 48 is operated by means of a screw 49, having the pinion 50, meshing with the gear-wheel 51, having a suitable handle 52, as plainly shown in Fig. 6. The rear roll 46 is journaled in a swinging head 53, which is pivotally secured at 97 upon the base-plate 61, Fig. 8, which is longitudinally adjustably secured upon the bed-plate 98 by means of the adjusting-screw 62, and the bed-plate 98 is transversely adjustably secured upon the transverse sliding carriage 48 by means of the bolt 99. The swinging head 53 is held normally away from the truing-head by the spring 54, Figs. 1 and 4, and it is thrown into operation with the roll 46 against the truing-head by means of the lever 55, pivoted to the side of the base-plate 61, the upper arm of which bears on an incline of the spring 56, which latter bears against the side of the swinging head. This lever 55 is connected at its lower end to the rod 57, which is provided with the stop 58, adapted to strike against the fixed abutment 59 in the forward movement of the carriage, thus forcing the upper end of the lever against the incline on the spring, thereby crowding the rear roll 46 against the truing-head, while the stop 60 on the rod 57 in the rearward movement of the carriage will carry the lever back to its initial position, and then the tension of the spring 54 will bring the roll into the position in Fig. 1.

The side or expanding roll 47 is provided with a face of suitable shape to bear against the side of the tire which is to be rolled.

63 is a transverse guide of the main frame, upon which is secured the adjustable bed-plate 64 by means of the set-screw 65, Fig. 3.

66 is a longitudinally-sliding table adjusted at its forward end by means of the screw-bolt 67, and held in contact with such bolt by means of the U-shaped spring 68, Fig. 3, the tension of the spring 68 acting against the forward end of the carriage 66.

Pivotally secured upon the table 66 by means of the bolt 70 is the swinging head 71, which carries the rear truing-roll 72, forming the companion roll for the front truing-roll 41. The rear truing-roll 72 is held against the truing-head 4 by the tension of the spring 73, Fig. 3, secured at one end to the table 66 and at the other end bearing against the swinging head 71.

74 is a hook secured upon the swinging head 71 and projecting some distance therefrom. It is adapted to be engaged by the hook 75, secured at the side of the truing-roll 41.

78 is an upward extension of the bolt 70, on which is adjustably secured the sleeve 79, having the side extension in which is adjustably secured the rod 80, carrying the roller-head 81, which is adjustable upon the rod in which is pivotally secured the roll 82.

The parts being thus constructed and arranged they are intended to operate as follows: Motion being given to the truing-roll it is now ready to receive a tire, which is placed by the operator upon the tire-holder 10 and fed upon the forward tapering end of the truing-roll by moving forward the lever 7, which, by means of the connecting-lever 9, operates the feed-table 5, carrying with it the tire-holder, which is brought from a horizontal to a vertical position in front of the truing-head by means of the crank-arm 13, Fig. 5, having a pin engaging into the segmental circular slot 14 of the frame. A tire is engaged over the end of the truing-head and slightly forced upon the tapering portion by the operator, who then withdraws the feed-lever 7 with the tire-holder to the position shown in Fig. 5. As the feed-lever 7 is brought back to its initial position the arm 19 is lowered by means of the connecting-link 16, engaging with the crank 17 of the rock-shaft 18, and rests with its hooked end in front of the truing-head. The operator now moves the friction-clutch 34 by means of the hand-lever 35 into engagement with the worm gear-wheel 32, which has motion imparted to it through the shaft 31, thus putting into operation the shaft 29, and with it the gear-pinions 28, engaging with the rack-bars 27 of the sliding carriage, the carriages being thus fed toward the truing-head 4. The swinging heads 37 and 38 are rotated toward the truing-head in this forward motion of the carriages by means of the spring-dogs 42 engaging with their head 44 in the notches of the periphery of the swinging heads, this rotary motion being continued until the abutments 45 strike against the stops 96, all being adjusted, so that the truing-rolls 40 and 41 will bear against the forward edges of the tire upon the truing-head, being held in contact with the side of the truing-head by the tension of the spring-dogs 42. The rear truing-roll 72 having been adjusted by the operator by means of the screws 67 and the top roll 82 having been similarly adjusted to the point to which the tire is desired to be driven upon the truing-head, it is evident that this will act as a stop for the tire. In this position (shown in Fig. 2) it is evident that the truing-head being rotated the front truing-rolls 40 and 41 will bear against the front edge of the tire, rolling it with even pressure and forcing it evenly upon the truing-head in the forward movement of the feed-carriages, the tire being expanded as it passes from the tapering portion to the cylindrical portion. This forward movement is continued until the rear edge of the tire is forced against and is rolled by the rear roll 72, which, being secured against rearward motion by the screw 67, acts as a stop to the tire, the further forward movement of the front truing-roll acting to roll the tire against the rear roll, thus truing the front and rear edges. The diameter of the tire when welded being less than the cylindrical portion of the truing-head, when it is forced upon the cylindrical portion of the head will be slightly expanded, all irregularities of the tire being eliminated and the tire assuming the circular shape of the truing-head. In the forward movement of the carriage 25, carrying the rod 57, the stop 58 will strike the stationary abutmunt 59, thereby operating the lever 55, which will bear with its upper end against the wedge-shaped spring 56, the end of which rests against the swinging head 53, carrying the rear roll 46. Thus the tension of the spring will hold the rear roll 46 against the side of the truing-head 4. By means of the handle 52, operating the pinion 51, which meshes with the gear-wheel 50, the carriage 48, and with it the rolls 46 and 47, is now adjusted toward the truing-head. The roll 46 bears more tightly against the truing-head under the tension of the spring 56, while the roll 47 is forced up tightly against the side of the tire. The effect of this rolling upon the side of the tire by the roll 47 is twofold. First, it gives the tire a perfect form at every point, rolling down any slight irregularities which may exist after it has been forced upon the truing-head due to the welding or other causes, and second, and principally, it rolls out the tire, slightly expanding it and loosening it by thinning. The tire when driven upon the head is so tightly fixed thereon as to make it difficult to remove by any ordinary pressure without bending it out of true, while, after rolling it with the roll 47, it is easily removed by the means hereinafter described. When the tire has been rolled thus and been made to assume the perfect circular contour of the truing-head at the point to which it has been forced by the front rolls to release it from its position upon the truing-head, the operator releases the friction-clutch 34 from the worm gear-wheel 32, thereby preventing further motion of the carriage. The friction-clutch may be released automatically, if desired, by having a stop suitably arranged in the path of the lever 35. In practice the shaft 23 acts as such stop. The operator now reverses the movement of the shaft 30 by means of the lever 76, attached to the end thereof. This, by means of the gear-pinions 28 on the shaft 29 engaging with the rack-bars 27 on the under side of the carriages, withdraws the carriages, and with them the rolls, from the truing-head, to the position shown in Fig. 1. It is evident that as the rear rolls 46, 72, and 82 engage with the rear edge of the tire this reverse movement will carry the tire from the truing-head. The reverse motion imparted to the carriage 25, which carries the rear roll 46, effects the movement of that roll against the tire, while the rolls 72 and 82 in this reverse movement are carried by the movement of the carriage 26 by means of the connection effected by the hook 75 engaging with the hook 74, this connection continuing until the hooks are disengaged by the rotary movement of the swinging head 38, caused by the spring-dog 42 engaging in a notch in the periphery of the swinging head, as before described. When the hooks are thus released, the sliding carriage 66, carrying the rear rolls 72 and 82, is moved again to its position shown in Fig. 1 by means of the spring 68 abutting with its rear end against the end of the screw 67. In the reverse motion of the carriage 25, which carries the rod 57, the stop 60 will strike against the stationary abutment 59, thereby operating the lever 55, releasing its engagement upon the incline of the spring 56, when the action of the spring 54 will swing the head 53 with the roll 46 away from the truing-head into its initial position. (Shown in Fig. 1.) The operator reverses the motion of the handle 52 to withdraw the carriage 48, which carries the rolls 46 and 47, by means of the connection described, to their initial position. (Shown in Fig. 1.) To repeat the operation, after placing a tire upon the tire-holder, the operator again moves forward the lever 7, which in its first movement operates the rockshaft 18 and the arm 19, upon the hooked end 20 of which the tire will have dropped when pushed off from the truing-head, carrying the tire upon the arm 19 to one side of the machine. A slot 77 is formed in the connecting-arm 9 to allow the first motion of the arm 7 to operate the rock shaft 18 in the manner before described. To carry the arm 19 out of the way of the tire-holder before the movement of the tire-holder toward the truing-head is commenced, the hook 20 on the arm 19 is so constructed that in the horizontal position of this arm the tire will engage in the hook, and when the arm is rocked the hook will be inverted, allowing the tire to drop.

It will be seen from the foregoing description that the tire is first fed upon the tapering portion of the truing-head. It is then forced over the tapering portion upon the cylindrical portion of the truing-head by the front truing-head, expanding the tire until it is forced against the rear truing-roll 72, which rolls the rear edge. The rear roll 46 is thrown into operation at the same time by the spring 56. The side roll 47 is now brought into operation, rolling out all inequalities and slightly expanding the tire, so that when the operator reverses the lever 76 the rear rolls 72, 82, and 46 bearing at three points on the rear side of the tire will force it off upon the removing-arm 19, by which it is carried out of the way, as before described.

A machine thus constructed trues the front and rear edges of the tire, making them parallel, and by making the tire conform to the shape of the truing-head forms the tire into a perfect circle.

The truing-head is made detachable, so that tires of different diameters may be trued by placing upon the drive-shaft truing-heads of different diameters, and all the parts are provided with the necessary adjustments to the same end. These adjustments may be accomplished in various ways, as may the adjustment of the table 48, with its side roll 47. If desired, this may be made automatic in its operation.

The process which is described herein and which is carried out herein I make the subject of a separate concurrent application, and therefore I do not herein claim the same.

The rear rolls, standing as they do at an angle to the face of the truing-head, are provided with suitable inclined faces to bear against the edge of the tire. The tire by being forced onto the truing-head by the feed-rolls becomes dished. The side or expanding roll is shaped so as to bear harder on the larger side of the tire while expanding it, and by this means it takes the dish out and the tire is made true.

What I claim as my invention is—

1. In a machine for truing tires, a rotary cylindrical truing-head having a tapering forward portion over which a tire is adapted to be moved, and means for moving the tire on the head, substantially as described.

2. In a machine for truing tires, the combination, with the tapering truing-head, of the front truing-rolls adapted to force the tire thereon, substantially as described.

3. In a machine for truing tires, the combination, with the tapering head, of the front truing-rolls journaled in swinging roller-heads at either side of the truing-head, adapted to swing inward to bear upon the tires, substantially as described.

4. In a machine for truing tires, the combination, with the tapering truing-head, of front truing-rolls journaled upon swinging roller-heads adjustably secured upon sliding feed-tables, substantially as described.

5. In a machine for truing tires, the combination, with the truing-head upon which the tire is adapted to be forced, of front truing-rolls journaled upon swinging roller-heads of sliding carriages carrying such roller-heads, and a feed device for reciprocating said carriages, substantially as described.

6. In a machine for truing tires, the combination, with the front truing-roll journaled in swinging roller-heads which are pivoted upon sliding carriages, of a feed device for reciprocating such carriages, and the spring-dogs 42, engaging at one end with the standard 43 and at the other end with the periphery of the swinging roller-heads, substantially as described.

7. In a machine for truing tires, the combination of the following elements: the frame 1, guide 100, adjustable bed-plates 21 and 22, sliding carriages 25 and 26, adjustable base-plates 36, swinging roller-heads 37 and 38, and truing-rolls 40 and 41, substantially as described.

8. In a machine for truing tires, the combination of the following elements: frame 1, guides 100, adjustable bed-plates 21 and 22, sliding carriages 26 and 25, carrying the truing-heads and the rack-bars 27, gear-pinions 28, slidingly secured upon the shaft 29 by means of a feather engaging in the keyway 101, the shaft 31, worm-gear 30, worm gear-wheel 32, friction-clutch 34, and hand-lever 76, substantially as described.

9. In a machine for truing tires, the combination, with the truing-head, of feed mechanism to feed the tire upon the tapering portion of the head, and of the front truing-rolls, and means for operating the same, substantially as described.

10. In a machine for truing tires, the combination, with the truing-head, of feed mechanism adapted to feed the tire upon the truing-head, a sliding feed-table carrying the front feed-rolls, arranged on either side of the truing-head, and of mechanism for reciprocating such feed-tables, substantially as described.

11. In a machine for truing tires, the combination, with a truing-head, of feed mechanism adapted to feed the tire upon the truing-head, of sliding feed-carriages carrying the front truing-rolls, of two or more rear rolls adapted to bear against the rear edge of the tire, of feed mechanism for reciprocating the feed-carriages, and of connections between the rear rolls and the feed-carriages, substantially as described.

12. In a machine for truing tires, the combination, with the tapering truing-head, of the front and rear truing-rolls adapted to roll the front and rear edges of the tire, substantially as described.

13. In a machine for truing tires, the combination, with the tapering truing-head, of the front truing-rolls, the rear truing-rolls, and a side expanding-roll, substantially as described.

14. In a machine for truing tires, the combination of the sliding carriage 26, carrying the front truing-roll 41, and of the rear truing-roll 72, forming a stop for the tire, substantially as described.

15. In a machine for truing tires, the combination of the sliding carriage 26, carrying the front truing-roll 41, journaled on the swinging roller-head 38 of the rear truing-roll 72, and a detachable connection between these front and rear rolls, substantially as described.

16. In a machine for truing tires, the combination of the sliding carriages 26, carrying the front truing-roll 41, journaled in the swinging head 38 of the rear truing-roll 72, journaled on the swinging head 71, the table 66, the hook 74 on the swinging head 71, and the hook 75 on the swinging head 38, substantially as described.

17. In a machine for truing tires, the combination of the following elements: the guide 63, adjustable bed-plate 64, sliding table 66, swinging head 71, rear truing-roll 72, journaled therein, of a spring 73, secured at one end to the table 66, and bearing with the other against the swinging head 71 of the spring 68, acting with its tension against the forward end of the table 66 and of the hooks 74 and 75, substantially as described.

18. In a machine for truing tires, the combination, with the rotary truing-head, of the side roll 47, and means for bringing the roll into operative position, substantially as described.

19. In a machine for truing tires, the combination of the rotary truing-head, the side roll 47, journaled upon a transverse adjustable sliding table, substantially as described.

20. In a machine for truing tires, the combination, with the sliding carriage 25, of the swinging roller-head 37, the front truing-roll 40, the sliding carriage 48, the rear roll 46, and the side roll 47, substantially as described.

21. In a machine for truing tires, in combination with the sliding carriage 25, and the swinging roller-head carrying the roller 40, of the sliding carriage 48, carrying the expanding side roll, and the rear roll 46 of the screw 49, gear-wheel 50, pinion 51, and handle, substantially as described.

22. In a machine for truing tires, the combination of the sliding carriage 25, the transverse sliding carriage 48, the bed-plate 98, the base-plate 61, swinging head 53, carrying the rear truing-roll 46, spring 54, spring 56, the lever 55, bearing with its upper end against the incline on the spring 56, the rod 57, the stops 58 and 60, and the fixed abutment 69, substantially as described.

23. In a machine for truing tires, the combination, with the frame and truing-head, of feed-table 5, feed-lever 7, connecting-link 9, tilting tire-holder 10, pivoted to the table, and crank-arm 13, having a pin engaging into a segmental circular slot 14, substantially as described.

24. In a machine for truing tires, the combination, with the frame of the feed-table 5, operated by the feed-lever 7, of the tilting tire-holder secured upon said feed-table, the arm 15 of the lever, the link 16, crank 17, rock-shaft 18, and tire-carrying arm 19, substantially as described.

25. In a machine for truing tires, a feed mechanism consisting of a feed-table operated by a feed-lever, of a tire-holder pivotally secured thereon and provided with adjustable arms, and of means, such as the crank-arm 13, having a pin engaging the segmental circular slot 14, for tilting the table from a horizontal to a perpendicular position in its forward movement, substantially as described.

26. In a machine for truing tires, the combination, with the truing-head, of the carrying-arm 19, having the hooked end 20, adapted to be inverted in its vertical position to drop the tire, substantially as described.

27. In a machine for truing tires, the combination, with the truing-head, of the rear truing-roll 72, secured upon the sliding table 66, and of the roll 82, carried by said table, substantially as described.

28. In a machine for truing tires, the combination, with the truing-head, of the sliding table 66, standard 78, sliding sleeve 79, the adjustable arm 80, roller-head 81, and roller 82, substantially as described.

29. In a machine for truing tires, the combination of the following elements: the truing-head 4, front truing-rolls 40 and 41, adjustably secured upon the sliding carriages 25 and 26, the rear rolls 46 and 72, side roll 47, tire-feeding mechanism, and mechanism for reciprocating the sliding carriages 21 and 22, the parts being intended to operate substantially as and for the purpose described.

30. In a machine for truing tires, the combination of the following elements: the frame, the adjustable bed-plates, right and left screw-threaded shaft 23, engaging in screw-threaded nuts secured to the bed-plate, sliding carriages 25 and 26 on said bed-plates, adjustable base-plates 36, swinging heads 37 and 38, carrying the front truing-rolls 40 and 41, the spring-dogs 42, abutments 45, and adjustable stops 96, the parts being arranged to operate substantially as and for the purpose described.

In testimony whereof I affix my signature in presence of two witnesses this 30th day of November, 1889.

PETER GENDRON.

Witnesses:
    ED. MCBREARTY,
    M. B. O'DOGHERTY.